B. TURGEON.
TIRE FOR AUTOMOBILES AND OTHER VEHICLES.
APPLICATION FILED AUG. 17, 1912.
1,071,191. Patented Aug. 26, 1913.
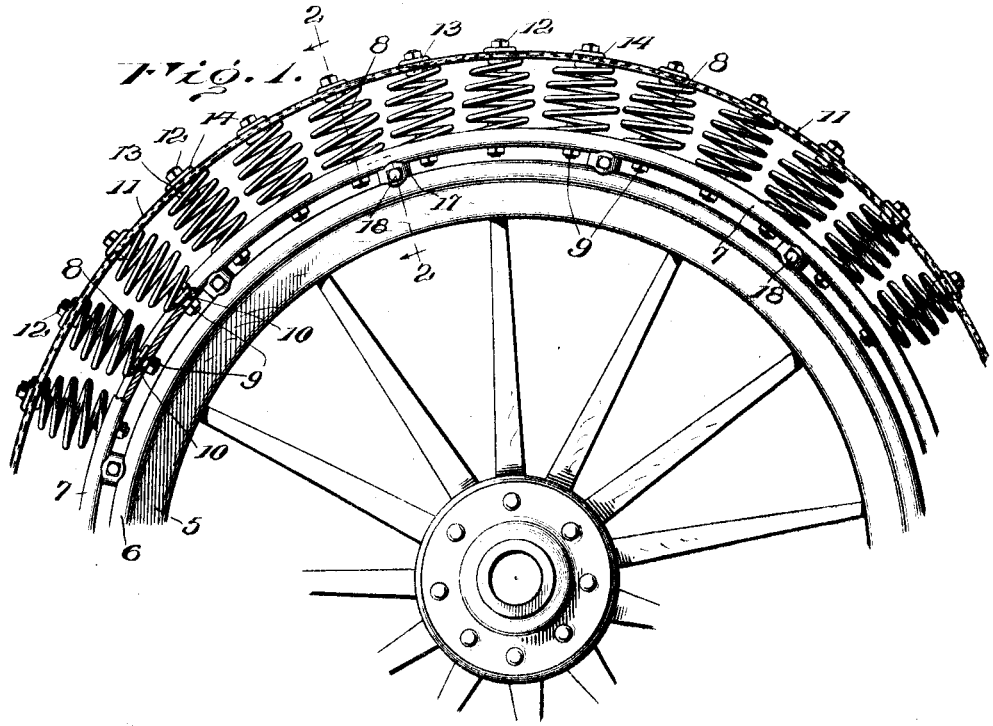
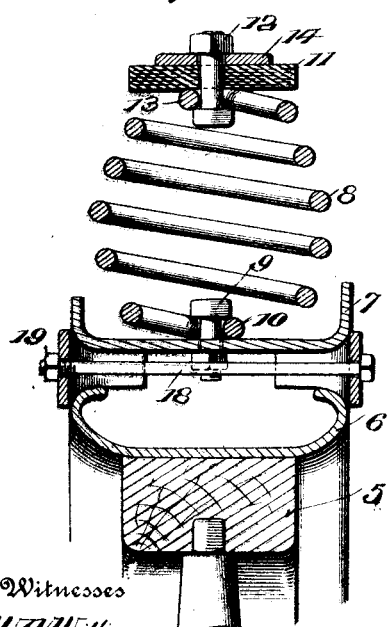
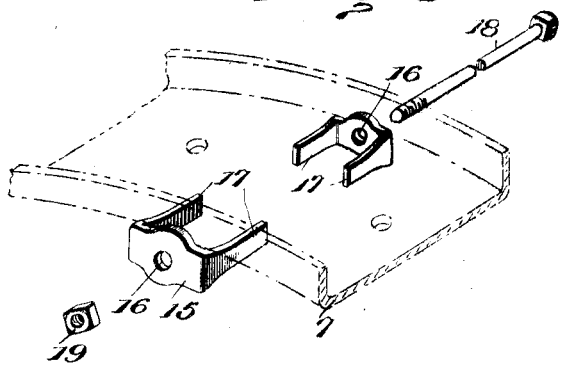
Witnesses
W. W. Williams.
L. B. Baker.
Inventor
Benjamin Turgeon
By Browne & Phelps
Attorneys

UNITED STATES PATENT OFFICE.

BENJAMIN TURGEON, OF BONESTEEL, SOUTH DAKOTA.

TIRE FOR AUTOMOBILES AND OTHER VEHICLES.

1,071,191.     Specification of Letters Patent.     Patented Aug. 26, 1913.

Application filed August 17, 1912. Serial No. 715,647.

*To all whom it may concern:*

Be it known that I, BENJAMIN TURGEON, a citizen of the United States, residing at Bonesteel, in the county of Gregory and State of South Dakota, have invented certain new and useful Improvements in Tires for Automobiles and other Vehicles, of which the following is a specification.

My invention relates to improvements in spring tires and pertains to a tire adapted to be applied to any of the ordinary types of automobile wheels.

The object of my invention is to provide a spring tire which shall be cheap, simple in construction and which can be readily substituted for a pneumatic tire, without altering or changing any parts of the wheel or rim, and which will have the necessary degree of resiliency.

With the foregoing and other objects in view my invention consists in certain constructions, combinations and arrangements of parts, the preferred form of which will be first described in connection with the accompanying drawings, and then the invention particularly pointed out in the appended claim.

Referring to the drawings wherein the same part is designated by the same reference numeral wherever it occurs, Figure 1 is a side elevation of a portion of the wheel showing the same as equipped with my invention, the parts being broken away to more clearly show the construction; Fig. 2 is a section taken on line 2, 2 of Fig. 1, and Fig. 3 is a detail perspective view of the tire securing parts in separated relation.

5 designates a felly of an ordinary wheel, and it is shown as equipped with the ordinary clencher rim 6. It will be understood however that my invention is not necessarily limited to use with a rim of this type.

7 designates a U-shaped ring with the ends of the U extending outward, which ring is slightly larger in diameter than the outside diameter of the rim 6.

8 designates a series of spiral springs secured at one end to the ring 7 by means of the bolts 9, one bolt passing through the eye 10 in each spring. Encircling the outer ends of the series of springs is a band 11, preferably formed of canvas, leather, or similar material, to which the outer ends of the springs 8 are secured by bolts 12 passing through the eyes 13 in the outer ends of the springs and the band. Preferably and as shown, between the nut of the bolt 12 and the band, I interpose a suitable washer 14 to prevent the bolt pulling through the band.

In order to secure the tire in position surrounding the rim 6 I provide a plurality of U-shaped securing devices 15, each comprising a central body portion having a perforation 16 therein, and a pair of arms 17 which are curved to conform to the curve of the upper edges of the rim 6 and the under side of the ring 7, as best shown in Figs. 2 and 3. Pairs of these securing devices are inserted on opposite sides between the edges of the rim 6 and the bottom of the ring 7, as shown in Fig. 1, and then bolts 18 are passed through the eyes 16 in the securing devices, the nut 19 placed on the bolt and turned up, thereby drawing the pairs of securing devices toward each other between the rim 6 and the ring 7 and securely fastening the ring to the rim.

From the foregoing description it will be seen that it is only necessary to remove the shoe and inner tube of the pneumatic tire from the rim to substitute my spring tire therefor and lock it in position by the securing devices, and that no changes have to be made in the rim or other parts of the wheel. If it should be desired to replace the pneumatic tire my spring tire can be readily removed by releasing the securing devices and the pneumatic tire replaced.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

A wheel having a fixed rim thereon, a demountable rim surrounding said fixed rim and spaced therefrom, and means for removably attaching said demountable rim comprising a plurality of U-shaped members adapted to extend between said rims and consisting of a central body having a perforation therethrough and arms extending therefrom, said arms being arranged at a right angle to the rims and in edge contact therewith and being curved to conform to the edges of said rims, and a bolt adapted to be inserted through the perforations in an oppositely disposed pair of said U-shaped members and provided with a nut, whereby said members are drawn toward each other to securely hold said demountable rim in place.

In testimony whereof I affix my signature in presence of two witnesses.

BENJAMIN TURGEON.

Witnesses:
GEO. S. LIVINGSTON,
F. L. BROWNE.